United States Patent [19]

Wagner et al.

[11] 4,008,091

[45] Feb. 15, 1977

[54] PROCESS FOR THE PRODUCTION OF FIRING STABLE YELLOW TO RED GLAZE MIXTURES

[75] Inventors: Hans B. Wagner, Bad Homburg; Arno Broll, Grundau, both of Germany

[73] Assignee: Deutsche Gold- und Silber-Scheideanstalt vormals Roessler, Frankfurt, Germany

[22] Filed: Feb. 10, 1976

[21] Appl. No.: 656,848

[30] Foreign Application Priority Data

Mar. 19, 1975 Germany ............................ 2511934

[52] U.S. Cl. .............................. 106/48; 106/301; 106/52; 106/49
[51] Int. Cl.[2] ...................... C03C 5/00; C03C 7/00; C08K 3/10; C08K 3/30
[58] Field of Search ............... 106/52, 48, 301, 49

[56] References Cited

UNITED STATES PATENTS

| | | | |
|---|---|---|---|
| 2,563,502 | 8/1951 | Swes | 106/48 |
| 2,916,387 | 12/1959 | Commons, Jr. | 106/52 |
| 3,230,283 | 1/1966 | Hughes | 106/48 |
| 3,278,332 | 10/1966 | Waxter et al. | 106/48 |
| 3,527,649 | 9/1970 | Sullivan | 106/301 |
| 3,802,900 | 4/1974 | Broll et al. | 106/301 |
| 3,847,639 | 11/1974 | Broll et al. | 106/288 B |
| 3,888,688 | 6/1975 | Broll et al. | 106/301 |

*Primary Examiner*—Patrick P. Garvin
*Assistant Examiner*—Mark Bell
*Attorney, Agent, or Firm*—Cushman, Darby & Cushman

[57] ABSTRACT

There is provided a process for the production of firing stable yellow to red glaze mixtures for ceramic products containing as a color carrier cadmium sulfide and-/or cadmium sulfoselenide, the glaze mixture consisting of 60 to 98 parts by weight of a base frit, 2 to 40 parts by weight of a color frit, and the customary amounts of suspension agents, in which the base frit can be any frit (known in itself) and the color frit consists of cadmium, sulfur and selenium containing compounds and a so-called base glass, which is composed of one or more known glaze frits. There is added to this color frit one or more glaze stable compounds in an amount of 25 to 95 weight % annealing carried out, at temperatures above 850° C. and subsequently the color frit mixed with the base frit and suspension agent. The glaze stable compound is zirconium oxide, zirconium silicate, tin oxide, cerium oxide, aluminum oxide or titanium oxide.

18 Claims, No Drawings

PROCESS FOR THE PRODUCTION OF FIRING STABLE YELLOW TO RED GLAZE MIXTURES

The invention is directed to a process for the production of fire stable yellow to red glaze mixtures using cadmium sulfide and/or cadmium sulfoselenide as a color carrier which is stabilized by the addition of glaze stable compounds.

There have long been known cadmium sulfide and/or cadmium sulfoselenide containing yellow to red glaze mixtures which when burned on ceramic articles or glass yields yellow to red glazes. However, since the cadmium sulfide and cadmium sulfoselenide pigments burn at temperatures above about 450° C. and decompose at temperatures above 850° C., it is necessary to use low melting glaze mixtures and frits as ingredients of the mixture. Therefore, in the past there have been numerous attempts to develop fire stable cadmium sulfide and/or cadmium selenide containing glaze mixtures. In Sullivan German Auslegeschrift No. 2,023,710, for example, there is described a red glaze which is first formed from a sulfur and selenium containing frit and a cadmium ion supplying material in the glaze baking, i.e., at the so-called ripening temperature. Wanie German Auslegeschrift No. 1,289,260 is concerned with color stable, zinc oxide containing selenium red glazes. There is used a cadmium, sulfur and selenium containing color body which is present in the glaze in an amount up to 25%, while the selenium content, however, is not allowed to exceed 0.6%.

It is common to all known selenium red and selenium yellow glazes that they need special glaze mixtures which have clearly reduced industrial use properties compared to other glazes. Besides a most unfavorably high coefficient of thermal expansion, of these necessary glaze mixtures (frits), also frequently the lower resistance to mechanical and chemical stresses compared to other glazes is disturbing.

Therefore, it was the problem of the present invention to find a process for the production of fire stable yellow to red glazes containing cadmium sulfide and/or cadmium sulfoselenide as a color carrier, whose coefficient of thermal expansion is in the range of customary, colorless transparent glazes, preferably below $60 \times 10^{-7} \times °C.^{-1}$ and whose mechanical properties and chemical resistance likewise are comparable with the values obtainable with the colorless, transparent glazes.

This problem was solved according to the invention by producing a glaze mixture consisting of 60 to 98 parts by weight of a base frit, 2 to 40 parts by weight of a color frit and the customary amounts of suspension agents in which the base frit can be any frit (known in itself) and the color frit consists of cadmium-, sulfur- and/or selenium compounds and a so-called base glass, which is composed of one or more known frits, which is characterized by adding one or more glaze stable compounds in amounts of 25 to 95 weight % to this color frit, annealing at temperatures above 850° C., e.g., up to 1400° C, and subsequently mixing the color frit with the base frit and the diluent. By the use of the known transparent glaze frits as base frit and main constituent of the color glazes producible by the process of the invention, there results a substantial universality of possible uses since the properties of the color glazes substantially correspond to those of the frit employed. Thus, in a special glaze problem in which specific properties are required a color glaze of the desired type can be put together by using a suitable transparent frit which has the required properties.

The use of a known transparent glaze frit with any coefficient of thermal expansion as base frit, and also as base glass is possible, because in that way the color carrier is stabilized by addition of glass stable compounds and annealing at temperatures above 850° C. and can no longer be attacked or can only be attacked to a very small extent by the glaze. As glaze stable compounds are meant inorganic materials which under the reaction conditions of the glaze formation either do not dissolve in the glaze or dissolve only with great difficulty. The glaze mixtures are composed essentially of two constituents, namely, the so-called base frit and a color frit. Additionally, there are employed the customary suspension agents such as kaolin, bentonite, clay, organic colloids or gums.

The portion designated as base frit produces substantially any known frit, preferably a transparent frit. Not usable are very aggressive, high-level or alkali-containing glass varieties. However, there can also be used frit combinations, glaze raw material additives, i.e., customary unfritted frit raw materials or combinations of frits with such a crude additive. The composition of this base frit as the predominant glaze component determines substantially the physical properties of the finished product. The product qualities are determined by a suitable selection so that therethrough there can be found a suited adaptation to special problems of use.

The composition of the ingredients of the mixture designated as the color frit is essential to the invention. This is characterized by consisting of compounds which contain the elements cadmium, sulfur and selenium, as, for example, cadmium oxide, cadmium carbonate, sodium sulfite, sodium sulfate, elemental sulfur, elemental selenium, [+] a so-called base glass, as well as a glaze stable constituent and are fritted at temperatures above 850° C. As glaze stable compounds there are especially approved zirconium oxide, zirconium silicate, tin oxide, ceric oxide, aluminum oxide and titanium oxide. Other suitable glaze stable compounds are calcium tin silicate ($CaSnSiO_5$) and zinc aluminum oxide ($ZnAl_2O_4$).

[+] sodium selenite, sodium thioselenite, selenium dioxide or cadmium selenide

The glaze stable constituent can also be formed in situ in the frit, as for example zirconium silicate from zirconium oxide and silica, preferably using a mineralizer such as an alkaline earth metal halide or alkali metal halide, e.g., calcium fluoride, lithium chloride or sodium chloride. Lithium fluoride is particularly advantageous as a mineralizer. The mineralizer can be used in an amount of 1 to 10 % of the color frit.

The component designated as base glass just like the base frit can consist of substantially any known frit, combination of frits, glaze raw batches or combination of frits and glaze raw batches. The proportion of color frit components is in the range of 5 to 50 weight % cadmium-, sulfur- and/or selenium containing constituent, 5 to 70 weight % base glass and 25 to 95 weight % of glaze stable constituent.

The addition of the glaze stable compound is essential for a stabilization of the cadmium sulfide- and/or cadmium sulfoselenide containing chromophore forming in the frit, so that this on the one hand can endure the high frit temperatures, and, on the other hand, has the desired glaze stability. The additive makes it possible to use almost any base frit including the relative aggressive ones.

Particularly high color intensities and smooth glaze surfaces are obtained by the addition to the color frit of up to 40% alkaline earth metal sulfates, such as barium sulfate or calcium sulfate or strontium sulfate or magnesium sulfate and/or an antimony (V) compound such as sodium antimonate or antimony pentoxide or potassium antimonate or lead antimonate or antimony pentasulfide or sodium thioantimonate. When such additives are employed they are usually used in an amount of at least 5 % of the color frit.

Unless otherwise indicated, all parts and percentages are by weight.

EXAMPLE 1

A red glaze of the required type was composed of

| | |
|---|---|
| Color frit | 10 parts by weight |
| Base frit | 90 parts by weight |
| Kaolin | 8 parts by weight |

The color frit was produced in the following manner. 8.8 parts by weight of cadmium oxide, 0.8 parts by weight of selenium and 7.3 parts by weight of sodium sulfite were used as cadmium, sulfur, and selenium containing compounds, 3.3 parts by weight of sugar (sucrose) were employed as a reducing agent for the formation of the chromophore from the above-named compounds, 29.5 parts by weight of zirconium oxide, 14.6 parts by weight of silica and 2.1 parts by weight of lithium fluoride (the lithium fluoride serving as a mineralizer for the formation of the glaze stable zirconium silicate in situ from the zirconium oxide and silica) as well as 33.6 parts by weight of a transparent frit of the melt formula 0.75 $CaO/0.25\ K_2O/0.5\ Al_2O_3/4\ SiO_2/1\ B_2O_3$ as the base glass were dry premixed, kneaded wet, dried and annealed at 1100° C.

10 parts by weight of the thus obtained color frit were worked in known manner to a glaze mixture with 90 parts by weight of substantially any transparent frit and 8 parts by weight of kaolin. As the base frit, there can likewise be employed the transparent frit added as a transparent frit.

When the mixture is charged to a ceramic body and fired, for example, at 950° C., there is obtained an intensive red colored glaze.

EXAMPLE 2

| | |
|---|---|
| Color frit No. I | 21.6 parts by weight |
| Base frit No. I | 78.4 parts by weight |
| Kaolin | 8 parts by weight |

The color frit I was obtained by annealing the following batch at 1120° C.

| | |
|---|---|
| Cadmium oxide | 9.9 parts by weight |
| Sodium sulfite | 7.7 parts by weight |
| Selenium | 1.3 parts by weight |
| Sugar | 3.0 parts by weight |
| Tin oxide | 51.2 parts by weight |
| Base glass I | 26.8 parts by weight |

The base glass I added in color frit I was composed of 74.6 parts by weight of a transparent frit of the melt formula 0.85 $Na_2O/0.1\ MgO/0.05\ CaO/0.9\ Al_2O_3/12.7\ SiO_2/3.6\ B_2O_3$, 16.0 parts by weight of boric acid and 9.4 parts by weight of lithium fluoride.

As base frit I there was used a transparent frit of the melt formula 0.8 $PbO/0.2\ CaO/0.15\ Al_2O_3/1.9\ SiO_2/0.2\ B_2O_3$.

There was obtained an intense red glaze at a firing temperature of 1060° C.

EXAMPLE 3

| | |
|---|---|
| Color frit No. II | 25 parts by weight |
| Base frit No. II | 75 parts by weight |
| Kaolin | 8 parts by weight |

The color frit II was obtained by annealing the following batch at 1240° C. for three hours.

| | |
|---|---|
| Cadmium oxide | 11.5 parts by weight |
| Sodium sulfite | 3.2 parts by weight |
| Sugar | 5.1 parts by weight |
| Zirconium oxide | 38.6 parts by weight |
| Silica | 19.1 parts by weight |
| Lithium fluoride | 2.8 parts by weight |
| Base glass II | 9.8 parts by weight |
| Barium sulfate | 9.8 parts by weight |

The base glass II added in color frit II consisted of a transparent frit with the melt formula 1.0 $Na_2O/3\ SiO_2/2\ B_2O_3$.

As base frit II there was used a transparent frit of the melt formula 0.6 $PbO/0.4\ CaO/0.1\ Al_2O_3/2.0\ SiO_2/0.1\ B_2O_3$.

There was obtained an intensive yellow glaze at a firing temperature of 1050° C.

EXAMPLE 4

| | |
|---|---|
| Color frit No. III | 13 parts by weight |
| Base frit No. III | 87 parts by weight |
| Kaolin | 10 parts by weight |

The color frit III was obtained by annealing the following batch at 1160° C.

| | |
|---|---|
| Cadmium oxide | 9.9 parts by weight |
| Selenium | 1.2 parts by weight |
| Calcium sulfate | 13.2 parts by weight |
| Sugar | 8.3 parts by weight |
| Zirconium oxide | 33.3 parts by weight |
| Silica | 16.4 parts by weight |
| Lithium fluoride | 2.7 parts by weight |
| Base glass III | 7.1 parts by weight |
| Sodium antimonate | 1.0 parts by weight |
| Barium sulfate | 7.0 parts by weight |

The base glass III employed in color frit III was composed of:

| | |
|---|---|
| Sodium tetraborate | 52.1 parts by weight |
| Silica | 47.9 parts by weight |

As base frit III, there was used a transparent frit of the melt formula 0.8 $PbO/0.2\ CaO/0.15\ Al_2O_3/1.9\ SiO_2/0.2\ B_2O_3$.

There was obtained an orange colored glaze at a firing temperature of 1020° C.

EXAMPLE 5

| | |
|---|---|
| Color frit No. IV | 32 parts by weight |
| Base frit No. IV | 68 parts by weight |

EXAMPLE 5-continued

| Kaolin | 6 parts by weight |
|---|---|

The color frit IV was obtained by annealing the following batch at 1050° C.

| Cadmium oxide | 10.8 parts by weight |
|---|---|
| Sodium sulfite | 8.4 parts by weight |
| Selenium | 1.4 parts by weight |
| Sugar | 3.3 parts by weight |
| Tin oxide | 55.6 parts by weight |
| Base glass IV | 15.9 parts by weight |
| Sodium antimonate | 4.8 parts by weight |

The base glass IV used in color frit IV was composed of:

| Silica | 25.8 parts by weight |
|---|---|
| Sodium tetraborate | 28.9 parts by weight |
| Boric acid | 27.7 parts by weight |
| Lithium boride | 17.6 parts by weight |

As base frit No. IV there was used a transparent frit of the composition 0.3 ZnO/0.25 CaO/0.25 Na$_2$O/0.15 K$_2$O/0.05 PbO/0.4 Al$_2$O$_3$/3.0 SiO$_2$/0.5 B$_2$O$_3$.

There was obtained an intensive red colored glaze at a firing temperature of 1100° C.

EXAMPLE 6

| Color frit No. V | 22 parts by weight |
|---|---|
| Base frit No. V | 78 parts by weight |
| Kaolin | 12 parts by weight |

The color frit V was obtained by annealing the following batch at 1050° C.

| Cadmium oxide | 5.5 parts by weight |
|---|---|
| Selenium | 0.3 parts by weight |
| Sulfur | 2.7 parts by weight |
| Aluminum oxide hydrate | 82.7 parts by weight |
| Base glass V | 7.9 parts by weight |
| Barium sulfate | 0.5 parts by weight |
| Sodium antimonate | 0.5 parts by weight |

The base glass V employed in the color frit V was composed of 31.6 parts by weight of a frit with the melt formula 0.6 PbO/0.4 CaO/0.1 Al$_2$O$_3$/2.0 SiO$_2$/1.0 B$_2$O$_3$ and 68.4 parts by weight of lead fluoride.

As base frit No. V, there was used a transparent frit of the composition 0.75 CaO/0.25 K$_2$O/0.5 Al$_2$O$_3$/4.0 SiO$_2$/1.0 B$_2$O$_3$.

There was obtained an orange colored glaze at a firing temperature of 1150° C.

The process can comprise, consist essentially of or consist of the steps set forth and can comprise, consist essentially of or consist of the material set forth.

What is claimed is:

1. In a process for the production of firing stable yellow to red glaze mixture for ceramic products employing a color carrier selected from the group consisting of cadmium sulfide, cadmium selenosulfide, and a mixture of cadmium sulfide and cadmium sulfoselenide comprising providing a composition comprising 60 to 98 parts by weight of a base frit, 2 to 40 parts by weight of a color frit and a suspension agent, said color frit comprising (a) either (1) a cadmium compound and (2) a sulfur source which is sulfur or a sulfur containing compound, or (1) a cadmium compound, (2) a sulfur source which is sulfur or a sulfur containing compound and (3) a selenium source which is selenium or a selenium containing compound, and (b) a base glass comprising a glazed frit the improvement comprising added to said color frit at least one glaze stable compound selected from the group consisting of zirconium oxide, zirconium silicate, tin oxide, ceric oxide, aluminum oxide, titanium oxide, calcium tin silicate, and zinc aluminum oxide in an amount to provide 25 to 95 weight % of the color frit, annealing the color frit at a temperature above 850° C. and subsequently mixing the color frit with the base frit and the suspension agent.

2. The process of claim 1 wherein the glaze stable compound is zirconium oxide, zirconium silicate, tin oxide, ceric oxide, aluminum oxide or titanium oxide.

3. The process of claim 2 wherein the color frit comprises 5 to 50 weight % (a), 5 to 70 weight % (b), and 25 to 95 % of the glaze stable compound.

4. The process of claim 2 wherein the cadmium compound is cadmium oxide or cadmium carbonate, the sulfur source is elemental sulfur, sodium sulfite, or sodium sulfate and the selenium source is elemental selenium.

5. The process of claim 2 wherein the glaze stable compound is zirconium silicate formed in situ in the annealing of the color frit.

6. The process of claim 2 wherein the annealing of the color frit is carried out in the presence of a mineralizer selected from the group consisting of alkaline earth metal halide and alkali metal halide.

7. The process of claim 6 wherein the mineralizer is calcium fluoride, lithium chloride or sodium chloride.

8. The process of claim 7 wherein the mineralizer is lithium fluoride.

9. The process of claim 2 wherein there is present a member of the group consisting of (1) an alkaline earth metal sulfate, (2) an antimony V compound and (3) a mixture of (1) and (2) in an amount sufficient to increase the color intensity and smoothness of the glaze surfaces.

10. The process of claim 9 wherein the alkaline earth metal sulfate and antimony compound (1), (2) or (3) is present in an amount up to 40% of the total weight of the color frit forming composition.

11. The process of claim 10 wherein the amount of alkaline earth metal sulfate and antimony compound (1), (2) or (3) is present in an amount of 1 to 40%.

12. The process of claim 10 wherein said member (1) is barium sulfate or calcium sulfate and said member (2) is sodium antimonate or antimony pentoxide.

13. The process of claim 12 wherein said member is barium sulfate.

14. The process of claim 12 wherein said member is sodium antimonate.

15. The process of claim 12 wherein said member is a mixture of barium sulfate and sodium antimonate.

16. The process of claim 2 wherein the base frit and base glass are so chosen that their combination gives a glaze with a coefficient of thermal expansion below 60 × 10$^{-7}$ ° C.

17. The process of claim 2 wherein the suspension agent is a clay.

18. The process of claim 17 wherein the clay is kaolin or bentonite.

* * * * *